United States Patent
Ishiguro

(10) Patent No.: US 7,150,085 B2
(45) Date of Patent: Dec. 19, 2006

(54) TURRET FOR MACHINE TOOL

(75) Inventor: Haruki Ishiguro, Nara (JP)

(73) Assignee: Mori Seiki Co., Ltd., Yamatokoriyama (JP)

( * ) Notice: Subject to any disclaimer, the term of this patent is extended or adjusted under 35 U.S.C. 154(b) by 0 days.

(21) Appl. No.: 11/203,966

(22) Filed: Aug. 16, 2005

(65) Prior Publication Data

US 2006/0064861 A1 Mar. 30, 2006

(30) Foreign Application Priority Data

Sep. 29, 2004 (JP) .............................. 2004-285545

(51) Int. Cl.
*B23P 23/02* (2006.01)
*B23B 29/32* (2006.01)
(52) U.S. Cl. ................ 29/40; 29/39; 408/35; 74/813 R
(58) Field of Classification Search .................... 29/40, 29/39, 48.5 R, 48.5 A, 26 A, 26 R, 35.5; 144/48.1; 408/35; 82/159, 120, 121; 74/813 L, 74/813 R, 826, 813 C
See application file for complete search history.

(56) References Cited

U.S. PATENT DOCUMENTS

| | | | |
|---|---|---|---|
| 3,760,472 A | | 9/1973 | Kielma et al. |
| 4,090,281 A | | 5/1978 | Hautau |
| 4,833,764 A | * | 5/1989 | Muller ........................... 29/40 |
| 4,991,474 A | * | 2/1991 | Thumm et al. ............... 82/159 |
| 5,720,090 A | * | 2/1998 | Dawson, Jr. .................... 29/40 |
| 6,925,694 B1 | * | 8/2005 | Sauter et al. .................. 29/40 |
| 2004/0103510 A1 | | 6/2004 | Sauter et al. |

FOREIGN PATENT DOCUMENTS

| | | | |
|---|---|---|---|
| EP | 331003 A2 | * | 9/1989 |
| EP | 1287931 A2 | * | 3/2003 |
| JP | 62-218002 | | 9/1987 |
| JP | 5-228708 | | 9/1993 |
| JP | 2003-251505 | | 9/2003 |
| WO | WO 2003000459 A1 | * | 1/2003 |

* cited by examiner

*Primary Examiner*—Monica Carter
*Assistant Examiner*—Dana Ross
(74) *Attorney, Agent, or Firm*—Armstrong, Kratz, Quintos, Hanson & Brooks, LLP

(57) ABSTRACT

A turret for use on a machine tool has a turret body, a swivel drum, an indexing actuator, a drive motor and a joint. While one of rotating tools on the turret is indexed to an indexed position, the joint directly connects the rotating tool to the drive shaft of the drive motor to rotate the rotating tool with the drive motor. The drive motor is fixed to the turret body and the drive motor has a housing supported on the turret body. The turret further comprises a liner whose thickness is adjustable disposed immediately behind the housing. The liner has the thickness thereof adjusted to adjust a position of the drive motor with respect to the turret body. The drive motor can be highly accurately assembled onto the turret body through an opening, of the turret body, which provides easy access to the turret body.

13 Claims, 3 Drawing Sheets

TURRET FOR MACHINE TOOL

BACKGROUND OF THE INVENTION

1. Field of the Invention

The present invention relates to a turret, for use on a machine tool, for mounting at least one rotating tool thereon and for rotating the rotating tool to machine a workpiece on the machine tool.

2. Description of the Related Art

Some machine tools, e.g., lathes, have a turret for mounting one or more rotating tools thereon and for rotating them with a drive motor to machine a workpiece on the machine tool. In the lathe, the turret has a swivel block mounted on a head thereof, and a plurality of tools including rotating tools and other machining tools are radially supported on the swivel block.

When the swivel block is swiveled about its own axis, a desired one of the supported tools (e.g., a rotating tool) is indexed to an indexed position (machining position). Then, the drive motor is energized to rotate the rotating tool about its own axis to machine the workpiece. The drive power or torque of the drive motor is transmitted to the rotating tool by a power transmitting mechanism including a belt, bevel gears and bearings.

Japanese laid-open patent publication No. 2003-251505, for example, discloses a tool turret, for use on lathes, for transmitting the drive power of a drive motor to a rotating tool on the turret through a power transmitting mechanism including bevel gears and bearings. The disclosed tool turret has a hollow swivel block which houses therein the bevel gears and bearings.

Published U.S. patent application No. 2004/0103510 discloses a tool turret having a drive motor disposed in a swivel drum. The drive motor is indirectly connected to a rotating tool mounted on the tool turret by a coupling mechanism (power transmitting mechanism) to rotate the rotating tool.

In the turret on the conventional lathes and on the lathe disclosed in Japanese laid-open patent publication No. 2003-251505, the drive motor is located in a position widely spaced from the rotating tool. Consequently, the power transmitting mechanism for transmitting the drive power from the drive motor to the rotating tool is relatively complex in structure. When the power transmitting mechanism is in operation, the belt, bevel gears, and bearings of the power transmitting mechanism generate heat and vibration. As a result, the power transmitting mechanism causes an energy loss, tending to lower the power transmitting efficiency and generate noise.

According to the tool turret revealed in Published U.S. patent application No. 2004/0103510, it is difficult to highly accurately assemble the drive motor onto a turret body through an opening, of the turret body, which provides easy access to the turret body. The coupling mechanism has a sensor and a mechanism for sliding a coupling. The sensor serves to detect a coupled state between the drive motor and a rotating tool. As a result, the coupling mechanism is of a complex structure, and it takes time for the coupling mechanism to connect and disconnect the drive motor and the rotating tool. Furthermore, a need has arisen to make it reliable to connect and disconnect the drive motor and the rotating tool.

SUMMARY OF THE INVENTION

It is an object of the present invention to provide a turret, for use on a machine tool, in which a drive motor can be highly accurately assembled onto a turret body through an opening, of a turret body, which provides easy access to the turret body.

To achieve the above object, there is provided in accordance with the present invention a turret, for use on a machine tool, for mounting at least one rotating tool thereon and for rotating the rotating tool to machine a workpiece, the turret comprising: a turret body supported on a base of the machine tool; a swivel drum supported on the turret body and supporting at least one tool holder which holds the rotating tool, the tool holder having a holder shaft; an indexing actuator having an index motor for swiveling the swivel drum to index the rotating tool to an indexed position; a drive motor disposed in the swivel drum and supported on the turret body, the drive motor having a drive shaft axially oriented toward the indexed position; and a joint for directly connecting the holder shaft of the tool holder and the drive shaft of the drive motor to each other to rotate the rotating tool with the drive motor while one of the rotating tools is indexed to the indexed position; wherein the drive motor is fixed to the turret body and the drive motor has a housing supported on the turret body, the turret further comprising: a liner whose thickness is adjustable disposed immediately behind the housing, the liner having the thickness thereof adjusted to adjust a position of the drive motor with respect to the turret body.

Preferably, the joint has a protrusion, which is disposed on either one of the holder shaft or the drive shaft, and a slot formed on the other of the holder shaft and the drive shaft; wherein the protrusion directly engages in or disengages from the slot in response to swiveling movement of the swivel drum for indexing one of the rotating tools to the indexed position; wherein the drive shaft of the drive motor and the holder shaft of the tool holder are directly coupled coaxially to each other by the joint; and wherein when the swivel drum is swiveled to completely index the rotating tool to the indexed position, the protrusion fully engages in the slot, so that the holder shaft and the drive shaft are completely connected to each other through the joint.

Preferably, when the rotating tool is to be indexed to the indexed position, a rotating tool which is going to be used in the indexed position is coupled to the drive motor by the joint, and simultaneously a rotating tool which has previously been used in the indexed position is released from the joint and is disconnected from the drive motor.

Preferably, the slot of the joint is defined as a straight groove in an end portion of the drive shaft; the slot is oriented in alignment with a plane, in which the swivel drum is swiveled, and opens at diametrically opposite sides of the drive shaft and also at an end face of the drive shaft when the rotating tool is to be indexed; and wherein the protrusion is formed on the holder shaft; and the protrusion has two opposite slide surfaces, disposed in slidable contact with and facing respective opposite side surfaces of the slot, and projects axially from an end of the holder shaft.

Preferably, the two opposite slide surfaces are slanted to provide a tapered tip end portion on the protrusion, and the slot is tapered in complementarily shaped relation to the protrusion.

Preferably, a rotation arrestor is nonrotatably disposed in the swivel drum and has an annular groove defined therein concentrically to the swivel drum, and the rotation arrestor extends circumferentially except for a region around the indexed position; and wherein the protrusions associated with the rotating tools, which are not in use and are placed in other positions than the indexed position, engage in the annular groove so that the rotating tools which are not in use are prevented from rotating by the rotation arrestor.

For example, the rotation arrestor extends circumferentially in an angular range which is smaller than but close to 360°.

Preferably, one or more rotating tools which are not in use are placed in other positions than the indexed position, and the protrusions of all the rotating tools which are not in use are oriented parallel to side surfaces of the annular groove to prevent all the rotating tools, which are not in use, from rotating.

Preferably, when the swivel drum is swiveled to index one of the rotating tools to the indexed position, the protrusions associated with all the rotating tools freely move uninterruptedly through the slot.

Preferably, the drive motor is mounted on the turret body through a relatively large mounting surface which is provided by a support member having a relatively large diameter.

Preferably, the drive shaft of the drive motor is rotatably supported on a support body, and the support body is fixed to the housing of the drive motor to prevent the drive shaft from moving along a central axis thereof.

In another embodiment, the drive shaft of the drive motor is rotatably supported on a support body, the support body may be movably fitted in the housing of the drive motor for movement along a central axis thereof, and the slot of the drive shaft may be movable at the joint along the central axis toward and away from the protrusion of the rotating tool which is indexed to the indexed position.

With the turret arranged as described above, the drive motor can be highly accurately assembled onto the turret body through the opening, of the turret body, which provides easy access to the turret body.

The above and other objects, features and advantages of the present invention will become apparent from the following description when taken in conjunction with the accompanying drawings which illustrate a preferred embodiment of the present invention by way of example.

DESCRIPTION OF THE PREFERRED EMBODIMENTS

Figure 1:
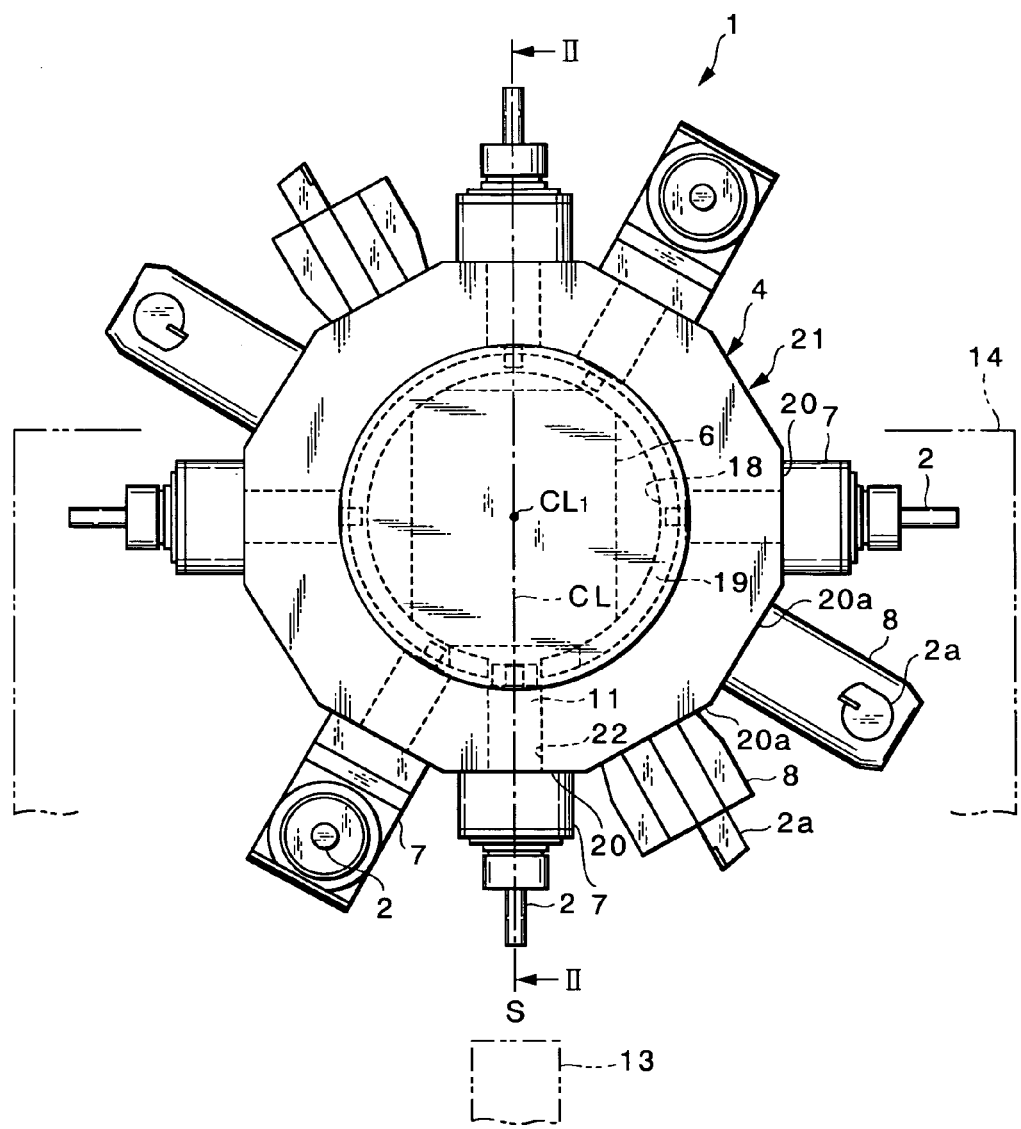
FIG. 1 is a front elevational view of a turret for use on a machine tool according to an embodiment of the present invention.

A turret for a machine tool according to an embodiment of the present invention has a joint directly connecting a rotating tool on a swivel drum and a drive motor to each other while the rotating tool is indexed to an indexed position (machining position). The rotating tool can be rotated about its own axis by the drive motor through the joint.

The drive motor is fixed to a turret body and the drive motor has a housing supported on the turret body. The turret further comprises a liner whose thickness is adjustable disposed immediately behind the housing. The liner has the thickness thereof adjusted to adjust a position of the drive motor with respect to the turret body. Accordingly, the drive motor can be highly accurately assembled onto the turret body through the opening, of the turret body, which provides easy access to the turret body.

The joint comprises a protrusion, which is disposed on either one of a holder shaft of a tool holder which holds the rotating tool or a drive shaft of the drive motor, and a slot formed on the other of the holder shaft and the drive shaft. In response to swiveling movement of the swivel drum to index the rotating tool, the protrusion directly engages in or disengages from the slot. The joint is of a simple structure and is capable of quickly and reliably connecting and disconnecting the rotating tool and the drive motor.

The drive motor is disposed in the swivel drum which is positioned mostly closely to the rotating tool. Therefore, the holder shaft, of the tool holder for holding the rotating tool, and the drive shaft of the drive motor can directly be connected to each other by the joint.

Since the joint does not cause an energy loss, the power transmitting efficiency with which the drive power from the drive motor is transmitted through the joint to the rotating tool is increased, and any heat, vibration and noise produced by the joint are reduced. The turret with the simple joint is also of a simple structure.

Specific details of the turret according to the embodiment of the present invention will be described below with reference to FIGS. 1 through 3. Identical parts are denoted by identical reference characters throughout views.

Figure 2:
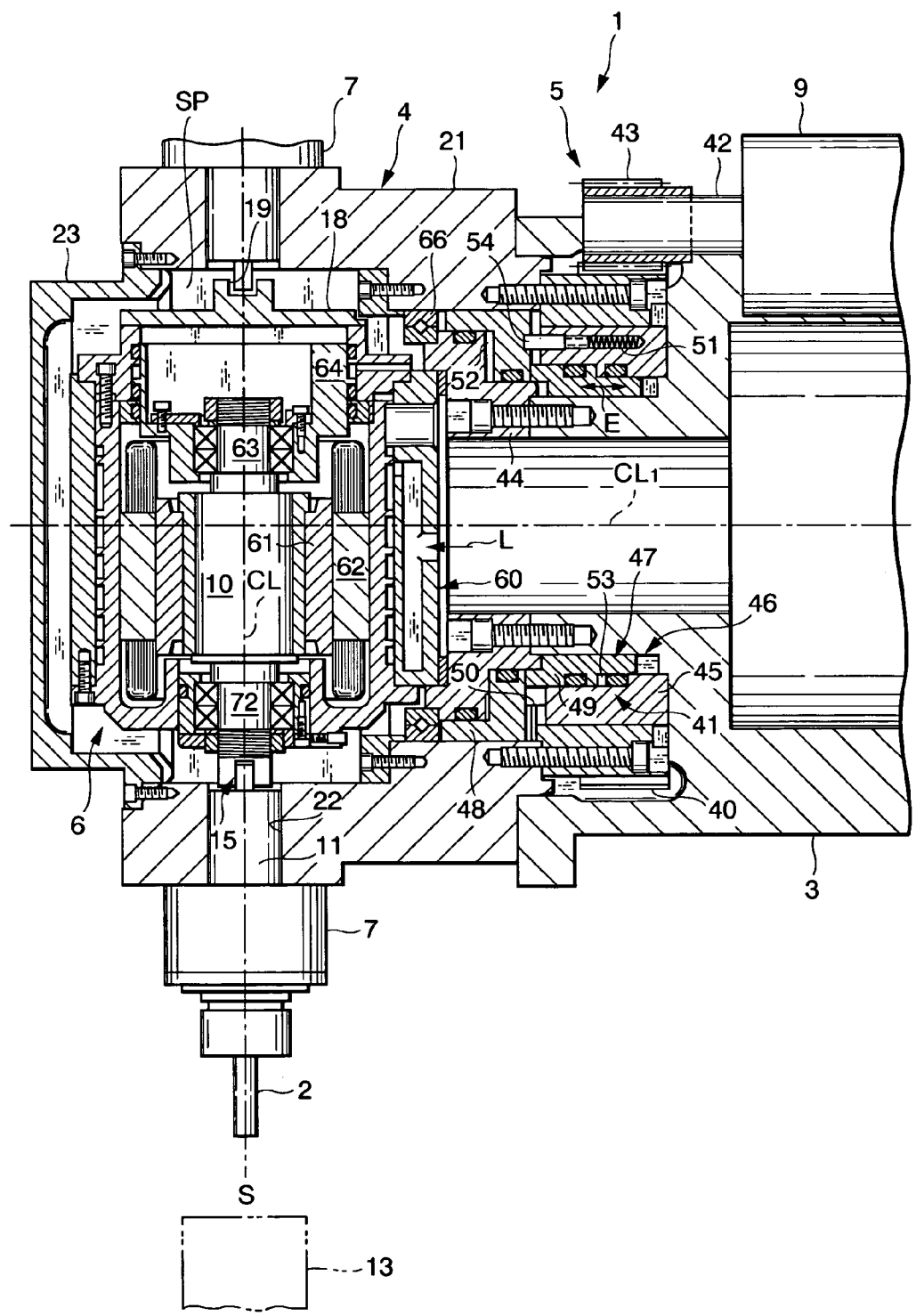
FIG. 2 is a cross-sectional view taken along line II—II of FIG. 1.
Figure 3:
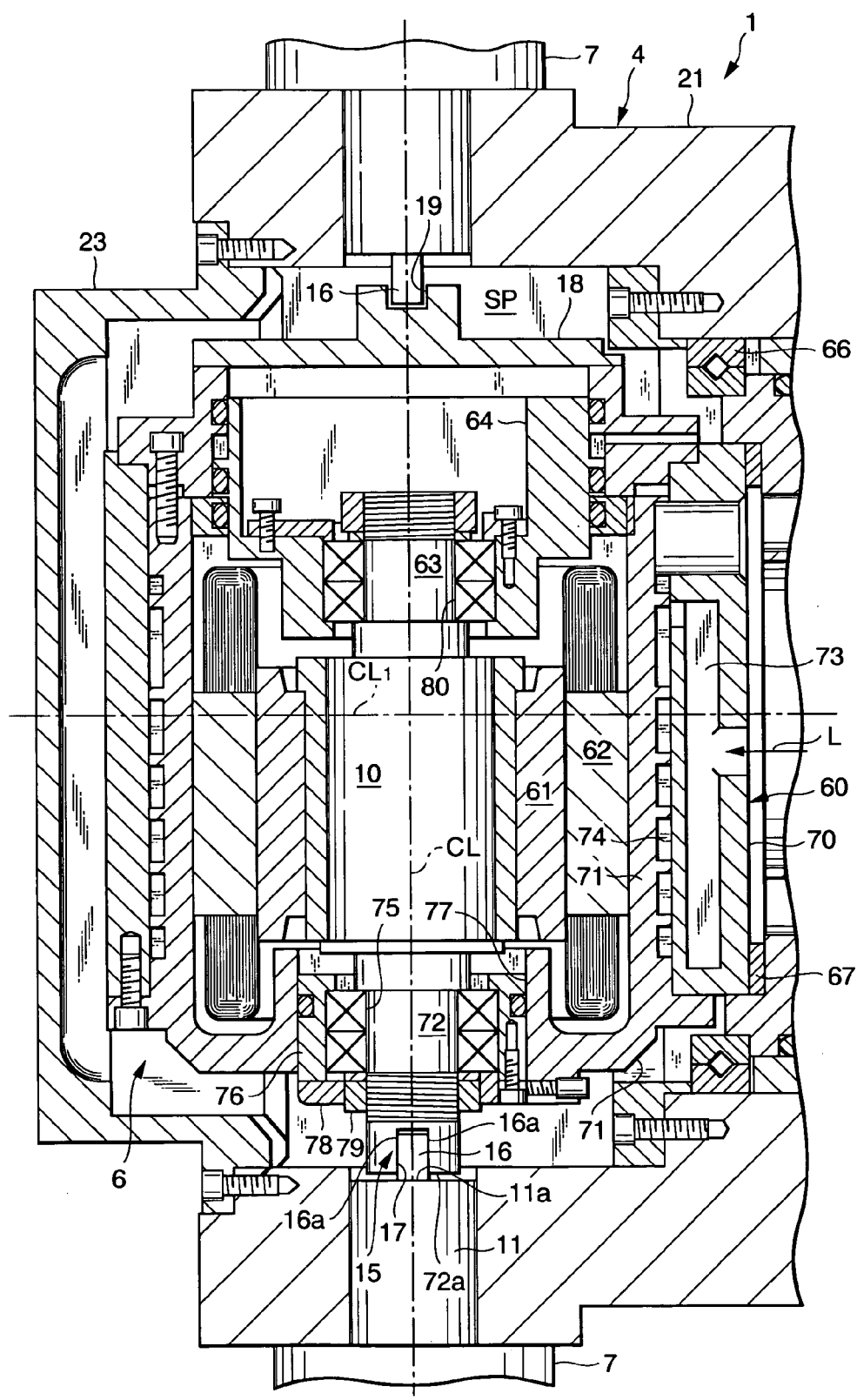
FIG. 3 is an enlarged cross-sectional view of a portion of FIG. 2.

As shown in FIGS. 1 through 3, a machine tool (e.g., a lathe) has a turret 1 with at least one rotating tool 2, e.g., six rotating tools 2 in FIG. 1, mounted thereon. Either one of the rotating tools 2 which is indexed to an indexed position (machining position) S can be rotated about its own axis to machine a workpiece 13. The machine tool with the turret 1 may be a turret-type machining center, rather than the lathe of this embodiment.

The turret 1 comprises a turret body 3, a swivel drum 4, an indexing actuator 5, a drive motor 6 and a joint 15. The joint 15 serves as a power transmitting mechanism for transmitting drive power from the drive motor 6 to one of the rotating tools 2 to rotate the rotating tool 2.

The turret body 3 is movably supported on a base (for example, a bed 14) of the lathe mounted on the floor. Specifically, the turret body 3 is supported on the bed 14 of the lathe and is relatively movable thereon along two mutually transverse axes directions with respect to the workpiece 13. Alternatively, the turret body 3 may be fixed to the bed 14, and the workpiece 13 may be movable along two mutually transverse axes directions with respect to the turret body 3.

The swivel drum 4 is supported on the turret body 3. At least one tool holder 7 for holding the rotating tool 2 can be mounted on the swivel drum 4. In the shown turret 1, the tool holders 7 and one or more tool holders 8 for holding respective other tools (for example, turning tools) 2a can be mounted radially on the swivel drum 4 at angularly spaced intervals. Alternatively, all tools mounted on the turret 1 may be rotating tools, i.e., all tool holders mounted on the turret 1 may hold rotating tools.

The indexing actuator 5 has an index motor 9 fixedly mounted on the turret body 3 or on a base of the lathe. The index motor 9 swivels the swivel drum 4 to index the rotating tool 2 to an indexed position S. When the index motor 9 is energized, it swivels the swivel drum 4 about a central axis CL1 thereof to index a desired one of the rotating tools 2 or the turning tools 2a to the indexed position S. It is assumed for illustrative purpose that one of the rotating tools 2 is indexed to the indexed position S.

The drive motor 6 serves to rotate the rotating tool 2 in the indexed position S about its own axis. The drive motor 6 is disposed in the swivel drum 4 and is supported on the turret body 3. The drive motor 6 has a drive shaft 10 with its central axis CL oriented toward the indexed position S at all times. When the drive motor 6 is energized, the drive shaft 10 rotates about the central axis CL.

While one of the rotating tools 2 is indexed to the indexed position S, the joint 15 directly connects the holder shaft 11, of the tool holder 7 for holding the rotating tool 2, to the drive shaft 10 of the drive motor 6. With the joint 15 connecting the holder shaft 11 to the drive shaft 10, the drive motor 6 is able to rotate the rotating tool 2 about its own axis through the joint 15.

The joint 15 has a slot 17 (see FIG. 3), defined in and diametrically across the drive shaft 10, and a protrusion 16 releasably engaging in the slot 17. The protrusion 16 is disposed on either one of the holder shaft 11 or the drive shaft 10 and the slot 17 is formed on the other of the holder shaft 11 and the drive shaft 10. Actually, all the tool holders 7 have respective protrusions 16 on the radially inner ends of their holder shafts 11. Alternatively, the slot 17 may be defined in each of the holder shafts 11 and the protrusion 16 may be disposed on the drive shaft 10.

In response to swiveling movement of the swivel drum 4 to index one of the rotating tools 2 to the indexed position S, the protrusions 16 which are associated with the rotating tools 2 can directly engage in or disengage from the slot 17. Specifically, when the swivel drum 4 is swiveled, the protrusion 16 on the holder shaft 11 of the tool holder 7 holding the rotating tool 2, which is going to be used in the indexed position S, is moved into the slot 17, and the protrusion 16 on the holder shaft 11 of the tool holder 7 holding the rotating tool 2, which has previously been used in the indexed position S, is moved out of the slot 17.

When the rotating tool 2 is to be indexed to the indexed position S, the drive shaft 10 of the drive motor 6 is stopped and the slot 17 is angularly positioned in alignment with the plane in which the swivel drum 4 is swiveled. The slot 17 thus oriented allows the protrusion 16 associated with the rotating tool 2 in the indexed position S to swivel uninterruptedly about the central axis CL1 when the swivel drum 4 is swiveled about the central axis CL1.

The joint 15 is of a simple structure and is capable of quickly and reliably connecting and disconnecting any one of the rotating tools 2 and the drive motor 6. Specifically, when the rotating tool 2 is to be indexed to the indexed position S, the rotating tool 2 which is going to be used in the indexed position S is coupled to the drive motor 6 by the joint 15, and simultaneously the rotating tool 2 which has previously been used in the indexed position S is released from the joint 15 and is disconnected from the drive motor 6.

The holder shaft 11 of the tool holder 7 for holding the rotating tool 2 is directly connected to the drive shaft 10 by the joint 15 in the indexed position S and can directly be disconnected from the drive shaft 10 by the joint 15. The joint 15 which thus directly connects the holder shaft 11 to the drive shaft 10 does not generate substantial heat, vibration and noise of the power transmitting mechanism while it is transmitting the drive torque from the drive motor 6 to the rotating tool 2.

As the joint 15 does not incorporate conventional power transmitting mechanisms including belts, bevel gears, bearings and couplings, any heat and vibration generated thereby is minimum while the joint 15 transmits the drive torque from the drive motor 6 to the rotating tool 2. As a result, the turret 1 can transmit the drive torque from the drive motor 6 to the rotating tool 2 with high efficiency and can allow the rotating tool 2 to machine the workpiece 13 with increased accuracy. Noise generated by the joint 15 is also small because vibration generated thereby is reduced.

The joint 15 as the power transmitting mechanism is made up of a relatively small number of parts. Therefore, the turret 1 is of a simple structure, facilitating maintenance of the turret 1.

The turret 1 has an inner space SP which is defined in the swivel drum 4 and which houses the drive motor 6 therein. Heretofore, the inner space SP in the swivel drum 4 would be used to incorporate bevel gears and bearings of the power transmitting mechanism. According to the present embodiment, however, the inner space SP is used to accommodate the drive motor 6 therein. Since no additional space needs to be defined in the turret 1 for housing the drive motor 6, the turret 1 is relatively compact in its entirety.

The drive shaft 10 of the drive motor 6 and the holder shaft 11 of the tool holder 7 for holding the rotating tool 2 are directly coupled coaxially to each other by the joint 15. The joint 15 allows the rotating tool 2 to rotate about its own axis at a high speed.

As shown in FIG. 3, the slot 17 for constituting the joint 15 is defined as a diametrically straight groove in and diametrically across an end portion 72 of the drive shaft 10. The end portion 72 includes an end face 72a of the drive shaft 10 and a shaft portion in the vicinity thereof. When the rotating tool 2 is to be indexed to the indexed position S, the slot 17 is oriented in alignment with the plane, in which the swivel drum 4 is swiveled, and opens at diametrically opposite sides of the drive shaft 10, which are spaced along a direction normal to the sheets of FIGS. 2 and 3, and also at the end face 72a of the drive shaft 10.

The protrusion 16, for constituting the joint 15, formed on the holder shaft 11 of each of the tool holders 7 is disposed on an end 11a of the holder shaft 11. The protrusion 16 has two parallel opposite flat slide surfaces 16a disposed in slidable contact with and facing respective opposite side surfaces of the slot 17. The protrusion 16 axially projects from the end 11a of the holder shaft 11.

The two opposite slide surfaces 16a may be slanted such that the protrusion 16 has a tapered tip end portion. If the protrusion 16 is thus tapered, then the slot 17 needs to be tapered toward its bottom in complementarily shaped relation to the protrusion 16.

Incidentally, the joint 15 may have a structure that the slot 17 is formed on the holder shaft 11 of the rotating tool 2 and that the protrusion 16 is disposed on the drive shaft 10.

According to the present embodiment, the swiveling movement of the swivel drum 4 to index one of the rotating tools 2 is directly utilized to connect the rotating tool 2 and the drive motor 6 to each other through the joint 15. Specifically, when the swivel drum 4 is swiveled to completely index the rotating tool 2 to the indexed position S, the protrusion 16 is moved into the slot 17. At the time the indexing of the rotating tool 2 to the indexed position S is completed, the protrusion 16 fully engages in the slot 17. As a result, the holder shaft 11 and the drive shaft 10 are completely connected to each other through the joint 15.

As described above, indexing one of the rotating tools 2 to the indexed position S causes the protrusion 16 of the rotating tool 2 to engage in the slot 17, and moving the rotating tool 2 out of the indexed position S causes the protrusion 16 of the rotating tool 2 to disengage from the slot 17.

Consequently, the swiveling movements of the swivel drum 4 for indexing the rotating tool 2 to the indexed position S and for moving the rotating tool 2 out of the indexed position S directly result in the connection and disconnection between the rotating tool 2 and the drive motor 6. It is not necessary to slide a coupling and to detect a connected state, as is the case with conventional mechanisms, for connecting the drive motor 6 and the rotating tool 2 to each other.

The rotating tool 2 and the drive motor 6 can, therefore, be connected quickly and reliably without the need for a complex mechanism for connecting and disconnecting the rotating tool 2 and the drive motor 6.

A rotation arrestor 18 is nonrotatably disposed in the swivel drum 4. The rotation arrestor 18 is of a substantially cylindrical shape and has an annular groove 19 defined therein concentrically to the swivel drum 4. The rotation arrestor 18 extends substantially along an inner circumferential surface of the swivel drum 4 which defines the space SP therein, in an angular range which is smaller than but close to 360°, except for a region around the indexed position S. Specifically, the rotation arrestor 18 has a gap or space positioned near the indexed position S in which the rotating tool 2 and the drive motor 6 can be connected to each other by the joint 15.

The protrusions 16 associated with the rotating tools 2, which are not in use and are placed in other positions than the indexed position S, engage in the annular groove 19 of the rotation arrestor 18 so that the rotating tools 2 which are not in use are prevented from rotating by the rotation arrestor 18.

Specifically, one or more rotating tools 2 which are not in use are placed in the other positions than the indexed position S. The protrusions 16 of all the rotating tools 2, which are not in use, are oriented parallel to side surfaces of the annular groove 19 to prevent all the rotating tools 2, which are not in use, from rotating.

The rotation arrestor 18 is disposed in the inner space SP in the swivel drum 4 and is supported on a housing 60 of the drive motor 6. Alternatively, the rotation arrestor 18 may be directly supported on the turret body 3 or may be supported on both the turret body 3 and the housing 60.

The rotation arrestor 18 can keep all the inactive rotating tools 2 stably nonrotatable on the swivel drum 4.

Since all the rotating tools 2, which are not in use and are placed in the other positions than the indexed position S, are prevented from rotating by the annular groove 19, the protrusions 16 associated with those rotating tools 2 are oriented along the plane in which the swivel drum 4 is swiveled. When the rotating tool 2 is to be indexed to the indexed position S, the drive shaft 10 of the drive motor 6 is stopped and the slot 17 is angularly positioned in alignment with the plane in which the swivel drum 4 is swiveled.

Therefore, when the swivel drum 4 is swiveled to index one of the rotating tools 2 to the indexed position S, all the rotating tools 2 not in use can be swiveled freely about the central axis CL1. Thus, the protrusions 16 associated with all the rotating tools 2 can freely move uninterruptedly through the slot 17.

Further structural details of the turret 1 will be described below.

The turret body 3 is supported on the bed (as the base of the machine tool) 14 for movement thereon along two mutually transverse axes directions with respect to the workpiece 13. The turret body 3 is of a hollow structure, and the index motor 9 is mounted on the turret body 3 at an outer position thereon.

The swivel drum 4 is supported on a distal end portion of the turret body 3 and can swivel about the central axis CL1. Although the central axis CL1 is shown as being oriented horizontally in FIGS. 2 and 3, the central axis CL1 may be vertical or oblique to the floor.

The swivel drum 4 is of a hollow annular shape and includes a drum body 21 having a polygonal (dodecagonal in FIG. 1) outer peripheral surface. The polygonal outer peripheral surface has a plurality of (twelve in FIG. 1) support facets 20, 20a.

The tool holders 7 for holding the rotating tools 2 are detachably mounted on the respective support facets 20. The rotating tools 2 may include a drill, an end mill, etc. The drum body 21 has a plurality of radial through holes 22 which are defined therein and which open at the respective support facets 20. The holder shafts 11 of the tool holders 7 are fitted respectively in the through holes 22.

The tool holders 8 for holding the other tools (e.g., turning tools) 2a for turning the workpieces 13 are mounted on the other support facets 20a. If those other tools 2a do not require tool holders, then they may be directly mounted on the support facets 20a.

In this manner, one or more tool holders 7, other tool holders 8 and the tools which do not require tool holders are mounted on the drum body 21 radially around the central axis CL1.

The swivel drum 4 also has the drum body 21 and a cover 23 mounted to cover an opening defined in a left side (see FIGS. 2 and 3) of the drum body 21, which is mounted on the turret body 3, for swiveling movement about the central axis CL1.

The drum body 21 can be only swiveled about the central axis CL1, but is not movable along the central axis CL1 and in radial directions perpendicular to the central axis CL1. The cover 23 is in the form of a bottomed hollow cylinder fixed to the drum body 21 over the opening therein, thereby closing the inner space SP in the swivel drum 4.

The indexing actuator 5 has, in addition to the index motor 9 fixed to the turret body 3, a gear 40 fixed to the drum body 21, and a clamp mechanism 41 (see FIG. 2). The gear 40 is held in mesh with a pinion 43 mounted on an output shaft 42 of the index motor 9.

The drive power or torque of the index motor 9 is transmitted to the swivel drum 4 through the output shaft 42, the pinion 43 and the gear 40. When the index motor 9 is energized to swivel the swivel drum 4, a desired rotating tool 2 or turning tool 2a can be indexed to the indexed position S.

The clamp mechanism 41 is disposed between the turret body 3 fixed against rotation and the swivel drum 4 supported on the turret body 3 for swiveling movement.

The swivel drum 4 and the drive motor 6 are supported on a support member 44 fixed to the distal end of the turret body 3. The support member 44 is positioned within the drum body 21 and has an annular shape. The drum body 21 is supported on the support member 44 by a bearing 66 for swiveling movement thereon. A cylinder member 45 having an annular shape is fixedly mounted in the gear 40.

The turret body 3, the cylinder member 45, the support member 44 and the drum body 21 jointly make up a cylinder 46 having cylinder chambers 52, 53.

The cylinder 46 serves to clamp and unclamp the swivel drum 4. The cylinder 46 is shown as being in a position to clamp the swivel drum 4 in an upper half of FIG. 2, and the cylinder 46 is shown as being in a position to unclamp the swivel drum 4 in a lower half of FIG. 2.

A piston 47 is slidably fitted, in the cylinder 46, for making reciprocating movement in the directions indicated by the arrow E along the central axis CL1. The piston 47 is limited by the turret body 3 to move reciprocally only in the directions indicated by the arrow E along the central axis CL1, but not to swivel about the central axis CL1.

The piston 47 comprises a first piston member 48 and a second piston member 49. The first piston member 48 is fitted between the drum body 21 and the support member 44. The second piston member 49 is fitted between the cylinder member 45 and the turret body 3 and also between the cylinder member 45 and the support member 44.

A connector 50 is disposed between the first piston member 48 and the cylinder member 45 for connecting and disconnecting the piston 47 and the swivel drum 4.

The connector 50 has radial gear teeth disposed around the central axis CL1. When the connector 50 connects the piston 47 and the swivel drum 4 to each other, the swivel drum 4 is held against swiveling movement about the central axis CL1. When the connector 50 disconnects the piston 47 and the swivel drum 4 from each other, the swivel drum 4 is allowed to make swiveling movement about the central axis CL1.

The cylinder member 45 has a compression spring 51 and an arrestor pin 54. The compression spring 51 is disposed in an axial hole defined in the cylinder member 45. The arrestor pin 54 is axially movably disposed in the axial hole, and has a tip end for projecting axially from the axial hole and for engaging in a slot which is defined in an axial end of the first piston member 48.

The compression spring 51 normally urges the arrestor pin 54 to be pressed against the first piston member 48, thereby preventing the first piston member 48 from rotating around the central axis CL1. Therefore, when the connector 50 disconnects the piston 47 and the swivel drum 4 from each other, the first piston member 48 does not rotate around the central axis CL1.

The cylinder chambers 52, 53 of the cylinder 46 can selectively be supplied with a fluid under pressure, e.g., oil under pressure or air under pressure.

For example, when the cylinder chamber 52 is supplied with the fluid under pressure and the cylinder chamber 53 is vented to the atmosphere, the piston 47 is axially moved toward the cylinder member 45, i.e., to the right in FIG. 2. The cylinder 46 now clamps the swivel drum 4 as shown in the upper half of FIG. 2, i.e., the connector 50 connects the piston 47 and the swivel drum 4 to each other, holding the swivel drum 4 against swiveling movement about the central axis CL1.

With the connector 50 connecting the piston 47 and the swivel drum 4 to each other, a desired rotating tool 2 or turning tool 2a can be positioned in the indexed position S for machining the workpiece 13.

Conversely, when the cylinder chamber 53 is supplied with the fluid under pressure and the cylinder chamber 52 is vented to the atmosphere, the piston 47 is axially moved away from the cylinder member 45, i.e., to the left in FIG. 2. The cylinder 46 now unclamps the swivel drum 4 as shown in the lower half of FIG. 2.

Since the connector 50 disconnects the piston 47 and the swivel drum 4 from each other, the swivel drum 4 is allowed to swivel about the central axis CL1. The swivel drum 4 can now be swiveled about the central axis CL1 to index a desired rotating tool 2 or turning tool 2a to the indexed position S.

When a desired rotating tool 2 is indexed to the indexed position S, the protrusion 16 associated with the indexed rotating tool 2 moves into and engages in the slot 17 of the drive motor 6. At the same time, the protrusion 16 associated with the rotating tool 2, which has previously been used in the indexed position S, moves out of the slot 17.

The indexed rotating tool 2 and the drive motor 6 are now directly connected to each other by the joint 15. As a result, the rotating tool 2 can be rotated by the drive motor 6.

The drive motor 6 is fixed to the support member 44 and is disposed in the inner space SP. The drive motor 6 is secured to the turret body 3 by the support member 44 which has a relatively large diameter. Therefore, the drive motor 6 is mounted on the turret body 3 through a relatively large mounting surface which is provided by the support member 44.

According to the published U.S. patent application No. 2004/0103510 described above, only a central portion of the drive motor is supported on the support member and hence the drive motor tends to be unstable in its supported state. According to the present embodiment, however, the drive motor 6 is firmly and stably supported on the turret body 3 through the relatively large mounting surface which is provided by the support member 44.

The housing 60 of the drive motor 6 is supported on the turret body 3. The drive shaft 10 of the drive motor 6 is supported in the housing 60 and is rotatable about the central axis CL. The drive motor 6 comprises a rotor 61 mounted on the drive shaft 10, a stator 62 mounted on the housing 60, and a support body 64 mounted on the housing 60. The stator 62 is positioned radially outwardly of the rotor 61 with a gap defined between the stator 62 and the rotor 61. The drive shaft 10 is rotatably supported by the support body 64.

As shown in FIG. 3, the housing 60 has an outer housing member 70, fixed to the support member 44, and an inner housing member 71 positioned within and fixed to the outer housing 70.

The drive shaft 10 has the end portion 72 rotatably supported on the inner housing member 71. The stator 62 is attached to an inner circumferential surface of the inner housing member 71. The outer housing member 70 has a fluid passage 73 defined therein, and the inner housing member 71 has a fluid passage 74 defined in an outer circumferential surface thereof and held in fluid communication with the fluid passage 73. The fluid passages 73, 74 are supplied with a coolant L such as cooling water or cooling oil for cooling the drive motor 6 thereby to reduce a machining error which is liable to develop due to a heat-induced displacement of the drive motor 6.

The turret 1 has a liner 67 whose thickness is adjustable. The thickness-adjustable liner 67 is disposed immediately behind the housing 60 of the drive motor, i.e., on a right side of the housing 60 in FIG. 2. The thickness of the liner 67 is adjusted to adjust the position of the drive motor 6 with respect to the turret body 3.

The thickness-adjustable liner 67 is disposed between the housing 60 and the support member 44. The liner 67, which is held in direct contact with the housing 60, allows the housing 60 to be positionally adjusted accurately and stably along the central axis CL1.

The drive motor 6 is mounted on the turret body 3. When the drive motor 6 is to be assembled on the turret body 3, the central axis CL of the drive shaft 10 needs to be aligned with central positions of the through holes 22 of the drum body 21. Usually, it is a complex process to assemble the drive motor 6 on the turret body 3 while achieving such axis alignment.

According to the present invention, the drive motor 6 is assembled onto the turret body 3 through the opening, of the turret body 3, which provides easy access to the turret body 3. At this time, the thickness of the liner 67 is adjusted to bring the central axis CL of the drive shaft 10 into alignment with the central positions of the through holes 22 (namely, central axes of the holder shafts 11 of the tool holders 7 fitted in the corresponding through holes 22). The central positions (central axes) of the through holes 22 cross each other on the central axis CL1.

In this easy manner for using the liner 67, the central axis CL of the drive shaft 10 can be highly accurately aligned with the central positions of the through holes 22 so that the drive motor 6 can be assembled highly accurately on the turret body 3.

The end portion 72 of the drive shaft 10 is rotatably supported on the inner housing member 71 by a bearing 75 and a sleeve 76. The sleeve 76 is fitted in a cylindrical hole 77 defined axially centrally in the inner housing member 71. The bearing 75 is disposed between the inner circumferential surface of the sleeve 76 and the drive shaft 10.

The drive shaft 10 has an opposite end 63 rotatably supported on the support body 64 by a bearing 80. The support body 64 has an annular shape and is attached to the housing 60. Since the support body 64 is fixed to the housing 60, the drive shaft 10 does not move along the central axis CL.

Alternatively, the support body 64 may be movably fitted in the housing 60 for movement along the central axis CL. If the support body 64 is movable along the central axis CL, then at the joint 15 the slot 17 of the drive shaft 10 is movable along the central axis CL toward and away from the protrusion 16 associated with the rotating tool 2 which is indexed to the indexed position S. As a result, the slot 17 can fully be fitted over the protrusion 16 or can fully be separated from the protrusion 16 along the central axis CL.

The drive motor 6 is controlled such that the slot 17 is angularly positioned in alignment with the plane in which the swivel drum 4 is swiveled when the drive shaft 10 of the drive motor 6 is stopped. Consequently, when the swivel drum 4 and the rotating tools 2 supported thereon are swiveled about the central axis CL1, the protrusions 16 associated with those rotating tools 2 can move through the slot 17 at the joint 15.

While the rotating tool 2 is indexed to the indexed position S, the protrusion 16 associated with the rotating tool 2 can engage in the slot 17. When the drive shaft 10 is rotated with the slot 17 engaging to the protrusion 16, the torque of the drive shaft 10 is transmitted through the joint 15 to the holder shaft 11, thereby rotating the rotating tool 2.

Specifically, when an electric current is supplied to the drive motor 6 to rotate the drive shaft 10, the drive power thereof is transmitted from the joint 15 through the holder shaft 11 to the rotating tool 2. The rotating tool 2 is now rotated at a speed established by the drive motor 6.

Operation of the turret 1 will be described below.

For indexing a desired rotating tool 2, the drive shaft 10 of the drive motor 6 is stopped and the slot 17 is angularly positioned in alignment with the plane in which the swivel drum 4 is swiveled. The slot 17 thus oriented allows the protrusion 16 associated with the rotating tool 2 in the indexed position S to swivel uninterruptedly about the central axis CL1 while the swivel drum 4 is swiveled about the central axis CL1.

The protrusions 16 of the tool holders 7 for holding the rotating tools 2, which are not in use and are placed in the other positions than the indexed position S, are prevented from rotating by the annular groove 19 of the rotation arrestor 18 and are oriented along the plane in which the swivel drum 4 is swiveled about the central axis CL1. Therefore, these protrusions 16 of the tool holders 7 for holding the rotating tools 2, which are not in use, can freely swivel uninterruptedly about the central axis CL1.

The cylinder chamber 53 of the clamp mechanism 41 is supplied with the fluid under pressure to move the piston 47 away from the cylinder member 45, i.e., to the left in FIG. 2. The connector 50 now disconnects the piston 47 and the swivel drum 4 from each other.

The index motor 9 is then energized, and the drive power thereof is transmitted through the pinion 43 and the gear 40 to the swivel drum 4. The swivel drum 4 which is supported on the support member 44 by the bearing 66 is swiveled to index a desired rotating tool 2 to the indexed position S.

The protrusion 16 associated with the rotating tool 2 indexed to the indexed position S now engages in the slot 17 in the drive shaft 10 at the joint 15. As a result, the rotating tool 2 is directly connected to the drive shaft 10 by the holder shaft 11 and the joint 15.

The cylinder chamber 52 of the clamp mechanism 41 is supplied with the fluid under pressure to move the piston 47 toward the cylinder member 45, i.e., to the right in FIG. 2. The connector 50 now connects the piston 47 and the swivel drum 4 to each other, locking the swivel drum 4 against swiveling movement from the angular position in which it has reached.

The drive motor 6 is then energized to rotate the drive shaft 10, so that the rotating tool 2 is rotated through the joint 15 at the established speed in the indexed position S thereby to machine the workpiece 13.

The principles of the present invention are applicable to machine tools having a turret with rotating tools mounted thereon for machining workpieces, e.g., lathes, turret-type machining centers, etc.

Although a certain preferred embodiment of the present invention has been shown and described in detail, it should be understood that various changes and modifications may be made therein without departing from the scope of the appended claims.

What is claimed is:

1. A turret, for use on a machine tool, for mounting at least one rotating tool thereon and for rotating said rotating tool to machine a workpiece, said turret comprising:
    a turret body supported on a base of said machine tool;
    a swivel drum supported on said turret body and supporting at least one tool holder which holds said rotating tool, said tool holder having a holder shaft;
    an indexing actuator having an index motor for swiveling said swivel drum to index said rotating tool to an indexed position;
    a drive motor disposed in said swivel drum and supported on said turret body, said drive motor having a drive shaft axially oriented toward the indexed position; and
    a joint for directly connecting said holder shaft of said tool holder and said drive shaft of said drive motor to each other to rotate said rotating tool with said drive motor while one of said rotating tools is indexed to the indexed position;
    wherein said drive motor is fixed to said turret body and said drive motor has a housing supported on said turret body, said turret further comprising:
    a liner disposed immediately behind said housing, said liner having a thickness to adjust a position of said drive motor with respect to said turret body.

2. A turret according to claim 1,
wherein said joint has a protrusion, which is disposed on either one of said holder shaft or said drive shaft, and a slot formed on the other of said holder shaft and said drive shaft; and
said protrusion directly engages in or disengages from said slot in response to swiveling movement of said swivel drum for indexing one of said rotating tools to the indexed position;
wherein said drive shaft of said drive motor and said holder shaft of said tool holder are directly coupled coaxially to each other by said joint; and
wherein when said swivel drum is swiveled to completely index said rotating tool to the indexed position, said protrusion fully engages in said slot, so that said holder shaft and said drive shaft are completely connected to each other through said joint.

3. A turret according to claim 2,
wherein said slot of said joint is defined as a straight groove in an end portion of said drive shaft;
said slot is oriented in alignment with a plane, in which said swivel drum is swiveled, and opens at diametrically opposite sides of said drive shaft and also at an end face of said drive shaft when said rotating tool is to be indexed; and
wherein said protrusion is formed on said holder shaft; and
said protrusion has two opposite slide surfaces, disposed in slidable contact with and facing respective opposite side surfaces of said slot, and projects axially from an end of said holder shaft.

4. A turret according to claim 3, wherein said two opposite slide surfaces are slanted to provide a tapered tip end portion on said protrusion, and said slot is tapered in complementarily shaped relation to said protrusion.

5. A turret according to claim 3,
wherein said drive shaft of said drive motor is rotatably supported on a support body,
said support body is movably fitted in said housing of said drive motor for movement along a central axis thereof, and
said slot of said drive shaft is movable at said joint along said central axis toward and away from said protrusion of said rotating tool which is indexed to the indexed position.

6. A turret according to claim 2,
wherein a rotation arrestor is nonrotatably disposed in said swivel drum and has an annular groove defined therein concentrically to said swivel drum, and said rotation arrestor extends circumferentially except for a region around the indexed position; and
wherein said protrusions associated with said rotating tools, which are not in use and are placed in other positions than the indexed position, engage in said annular groove so that said rotating tools which are not in use are prevented from rotating by said rotation arrestor.

7. A turret according to claim 6, wherein said rotation arrestor extends circumferentially in an angular range which is smaller than but close to 360 degree.

8. A turret according to claim 6, wherein one or more rotating tools which are not in use are placed in other positions than the indexed position, and said protrusions of all said rotating tools which are not in use are oriented parallel to side surfaces of said annular groove to prevent all said rotating tools, which are not in use, from rotating.

9. A turret according to claim 8, wherein when said swivel drum is swiveled to index one of said rotating tools to the indexed position, said protrusions associated with all said rotating tools freely move uninterruptedly through said slot.

10. A turret according to claim 1, wherein when said rotating tool is to be indexed to the indexed position, a rotating tool which is going to be used in the indexed position is coupled to said drive motor by said joint, and simultaneously a rotating tool which has previously been used in the indexed position is released from said joint and is disconnected from said drive motor.

11. A turret according to claim 1, wherein said drive motor is mounted on said turret body through a relatively large mounting surface which is provided by a support member having a relatively large diameter.

12. A turret according to claim 1, wherein said drive shaft of said drive motor is rotatably supported on a support body, and said support body is fixed to said housing of said drive motor to prevent said drive shaft from moving along a central axis thereof.

13. A turret according to claim 1,
wherein said liner is disposed between said housing and a support member fixed to a distal end of said turret body, and
said liner, which is held in direct contact with the housing, allows the housing to be positionally adjusted accurately and stably along a central axis.

* * * * *